G. A. CAMPBELL.
SIGNALING CIRCUIT.
APPLICATION FILED SEPT. 9, 1916.

1,254,472.

Patented Jan. 22, 1918.
5 SHEETS—SHEET 1.

WITNESSES:
Joseph A. Gately
Mary J. Deagle

INVENTOR
George A. Campbell
BY
Thomas D. Lockwood
ATTORNEY

G. A. CAMPBELL.
SIGNALING CIRCUIT.
APPLICATION FILED SEPT. 9, 1916.

1,254,472.

Patented Jan. 22, 1918.
5 SHEETS—SHEET 2.

WITNESSES:
Joseph A. Gately
Mary J. Deagle

INVENTOR
George A. Campbell
BY
Thomas D. Lockwood
ATTORNEY

UNITED STATES PATENT OFFICE.

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK.

SIGNALING-CIRCUIT.

1,254,472.  Specification of Letters Patent.  Patented Jan. 22, 1918.

Application filed September 9, 1916. Serial No. 119,283.

*To all whom it may concern:*

Be it known that I, GEORGE A. CAMPBELL, residing at Montclair, in the county of Essex and State of New Jersey, have invented certain Improvements in Signaling-Circuits, of which the following is a specification.

This invention relates to circuit arrangements for signaling systems wherein signals may be either transmitted from or received at the same station. In its more specific aspects this invention is embodied in a subscriber's telephone station, hereinafter termed, in accordance with common usage, a substation, and more particularly in the combination of a substation and a telephone line. Its object is to provide a signaling circuit arrangement which in coöperative combination with a similar and equal communicating arrangement or station shall deliver the maximum amount of energy to the receiving apparatus of said communicating station or arrangement. A further object is to provide an arrangement such that the receiving apparatus is protected from interference by the transmission energy originating at the same station. In other words its object is to provide signaling means characterized by the maximum possible ratio of received and transmitted energy and further characterized by the absence of side tone.

The object of the invention is attained, in its specific aspect, by providing a substation consisting of transmitter, receiver, auxiliary resistance, and a transformer having a plurality of windings which, in combination with a telephone line, shall satisfy the following fundamental requirement: Given two identical substations designed for invariable two-way communication, and connected by a line of given impedance and length, the amount of energy absorbed by the receiver at the receiving station shall be the maximum part of the total telephonic energy developed by the transmitter at the transmitting station consistent with invariable two-way communication, and, as hereinafter explained, consistent with a desirable amount of discrimination against disturbing line noise. This fundamental requirement may be stated in terms of the following subordinate requirements which are necessary for its satisfaction: (1) the transmitter and receiver shall be conjugate, that is there shall be negligible side tone in the receiver in consequence of the actuation of the transmitter by sound waves; (2) the line and auxiliary resistance shall be conjugate in order that none of the energy absorbed by the substation from the line shall be wasted in said auxiliary resistance; (3) for a given line having a definite impedance the telephonic energy delivered by the transmitter shall be a maximum; (4) the amount of energy delivered by the line to the substation shall be a maximum, in other words the impedance of the substation as seen from the line shall be equal to the impedance of the line; (5) at a small sacrifice of efficiency it shall be possible to discriminate effectively against disturbing line noise as distinguished from the telephonic signals from the communicating station.

A substation satisfying the above-mentioned requirements is ideal in that its overall efficiency from transmitter of one substation to receiver of the communicating substation is a theoretical maximum which cannot be exceeded by any invariable substations whether satisfying the requirements of transmitter and receiver conjugacy or not. It is further ideal in the sense that a minimum number of elements is employed since at least one auxiliary element is necessary to secure freedom from side tone.

It might be inferred that the addition of an auxiliary resistance element, necessary as it is to secure freedom from side tone, would at the same time necessarily reduce the efficiency of the substation since energy is unavoidably wasted in said auxiliary resistance. That this is not the case and that the efficiency of the substation of my invention is a theoretical maximum which cannot be exceeded by any two-way substation whether with or without side tone, the following considerations will show. The simplest form of substation for invariable two-way communication is that in which the receiver and transmitter are connected in series with each other across the line. In such an arrangement the over-all efficiency is a maximum when the resistance of the receiver is equal to that of the transmitter. When this condition is satisfied obviously fifty per cent. of the energy delivered by the line to the substation is wasted in the transmitter and fifty per cent. of the energy delivered by the transmitter is wasted in the receiver. Further such an arrangement labors under the disadvantage of full side tone. In the substation of my invention fifty per cent. of the energy delivered by the line to the substation is wasted in the transmitter but none in the auxiliary resistance if said auxiliary resistance and said line are conjugate; hence the efficiency is as great as that of the simple series substation. When transmitting no energy is wasted in the receiver but fifty per cent. of the energy delivered by the transmitter is wasted in the auxiliary resistance. The transmitting efficiency is therefore also a theoretical maximum and neither transmitting nor receiving efficiency is reduced by the addition of the auxiliary resistance which is necessary to secure freedom from side tone. The foregoing consideration will serve to explain the desirability of having the line and auxiliary resistance conjugate as well as the transmitter and receiver.

In my present invention I provide a substation comprising transmitter, receiver, auxiliary resistance and transformer, and so proportion said component elements and so relate them to a telephone line and to each other that, in combination with said telephone line, said substation satisfies all of the foregoing requirements.

I have discovered that the above-mentioned requirements may be satisfied by a large number of arrangements employing the minimum number of elements and all equally efficient and without side tone. While theoretically all these arrangements are equally good, practical considerations make certain arrangements preferable.

My invention will now be fully understood by reference to the accompanying drawing in which.

In order to illustrate the scope of my invention and elucidate the principles on which all specific embodiments rest, a general theoretical discussion will now be given which applies to all substations satisfying the requirements heretofore stated in this specification. In this discussion and the equations and formulæ included in this specification the subscripts 1, 2, 3 and 4 will refer to transmitter, receiver, auxiliary resistance and line respectively. Thus $I_1, I_2, I_3, I_4$ will denote the currents flowing in transmitter, receiver, auxiliary resistance and line respectively, while $R_1$ will denote the resistance of the transmitter, $R_2$ the resistance of the receiver, etc.

Consider a substation consisting of transmitter, receiver, auxiliary resistance and appropriate transformer windings, connected to a line of given impedance. In practice the line connects two similar and equal substations between which communication is established. It is a well known principle that if a terminal impedance is connected to a source of electromotive force through a line of impedance $$Z = R_4 + iR'_4,$$

where $R_4$ is the resistance and $R'_4$ the reactance component of the impedance, the terminal impedance must be $R_4 - iR'_4$ for maximum absorption of energy. In particular if the line impedance has no reactance component, the impedance of the terminal arrangement as seen from the line should be equal to the resistance component of the impedance of the line. The condition, then, that the substation shall have maximum energy absorption from the line is that its impedance, as seen from the line, shall be equal to the line impedance. The significance of the foregoing statement may be explained by reference to Fig. 5 as follows: Let the substation be disconnected from the line and let the impedance of the substation be measured across terminals 1 and 2. Then the impedance so measured shall be equal to the impedance of the line. With the line terminated at each end by a substation satisfying this condition, the line may be replaced, as regards transmission from either substation, by an impedance element of resistance equal to the impedance of the line. Any reactance effect, which is in practice small, may be eliminated by neutralizing reactance and, therefore, need not be considered. The condition, then, that the substation have maximum energy absorption from the line is that its impedance as seen from the line be a pure resistance of value equal to the impedance of the line. This condition is evidently equivalent to the following requirement; let an electromotive force be impressed on the substation terminals through a resistance equal to the impedance of the line; then the energy consumed in the substation shall be equal to the energy consumed in said resistance.

Further, line and auxiliary resistance are conjugate by requirement (2), as hereinbefore stated, or in other words, the auxiliary resistance is connected to points of equal potential with respect to an electromotive force applied to the line terminals. Moreover, the impedance of the substations as seen from the line should be equal to that of the line. Let, then, an electromotive force $E_4$ be impressed through a resistance $R_4$ on a substation whose transmitter and receiver resistances are $R_1$ and $R_2$ respectively, and let the resultant currents in line, transmitter and receiver be $I_4$, $I_1$ and $I_2$ respectively; then the impedance across the substation terminals must be $R_4$ as seen from the line and the total resistance in series with $E_4$ is $2R_4$, and since the current in the line is $I_4$ it follows that $$\frac{E_4}{2R_4} = I_4$$

The total energy consumed may then be expressed by the formula $$I_4^2 R_4 + I_1^2 R_1 + I_2^2 R_2 = I_4 E_4 = \frac{E_4^2}{2R_4}$$

Since the energy consumed by the substation is equal to that consumed by the resistance $R_4$ and is therefore one half of the total energy consumed, it follows that requirement 4 may be formulated by the following equation:

$$R_4 (I_4)^2 = (I_2)^2 R_2 + (I_1)^2 R_1 = \frac{(E_4)^2}{4R_4} \quad (1)$$

This equation states that the energy consumption in the resistance $R_4$ is equal to that in the substation, and that the substation is equivalent, as seen from the line, to a resistance of value $R_4$.

Similarly, if transmitter and receiver are conjugate the condition that the transmitter shall have its maximum output to line and auxiliary resistance may be formulated as follows: Let an electromotive force $E_1$ in the transmitter produce currents $I_1$, $I_4$ and $I_3$ in transmitter, line and auxiliary resistance. Then, for maximum output, it follows that $$(I_1)^2 R_1 = (I_4)^2 R_4 + (I_3)^2 R_3 = \frac{(E_1)^2}{4R_1} \quad (2)$$

Equation (2) is the analogue of equation (1) and may be interpreted as follows by reference to Fig. 5: Let the transmitter be disconnected from terminals 3 and 4 and let the impedance be measured across said terminal. Then if equation (2) is satisfied the impedance so measured is equal to the impedance of the transmitter itself. In other words, the impedance of the combination, as seen from the transmitter is equal to that of the transmitter itself.

As hereinafter shown for the particular embodiments of my invention, equation (2) follows as a consequence of the conditions of double conjugacy and equation (1). Therefore the foregoing four requirements impose but three restrictions on the substation.

To complete the general discussion it remains to consider the energy division between receiver and transmitter when receiving, and between line and auxiliary resistance when transmitting. Let $W_0$ be the total amount of telephonic energy developed by the transmitter at the transmitting substation; then, by equation (2), $1/2 W_0$ is the amount of energy delivered to line and auxiliary resistance. Let the amount of energy taken by the auxiliary resistance be $x$ times that taken by the line, then the amount of energy taken by the line is $$1/2 W_0 \frac{1}{(1+x)}$$

so that the transmitting efficiency is measured by $$\frac{1}{(1+x)} \quad (3)$$

Of the total energy delivered to the receiving substation, let the transmitter absorb $y$ times that absorbed by receiver; then the receiving efficiency is measured by $$\frac{1}{(1+y)} \quad (4)$$

The over-all efficiency from transmitter of one station to receiver of communicating station is clearly proportional to the product of the transmission efficiency and receiving efficiency; therefore the over-all efficiency is by formulæ (3) and (4):

$$\left(\frac{1}{1+x}\right)\left(\frac{1}{1+y}\right)$$

If $x$ and $y$ were independent, clearly the over-all efficiency would be a maximum for $x=y=0$. For all substations embodying the principles of my invention it may be readily shown, however, that $x$ and $y$ are connected by the relation $xy=1$. Eliminating $x$ from the above formulæ by means of this relation, the expression for the over-all efficiency becomes $$\frac{y}{(1+y)^2} \quad (5)$$

In order to demonstrate the above statement, namely that $xy=1$, designate the elements or branches T, R, X and L by 1, 2, 3 and 4, respectively, and let 1 and 2 be conjugate and also 3 and 4 be conjugate. Further it will be assumed for an electromotive force in branch 4, equation (1) is satisfied while for an electromotive force in branch (1), equation (2) is satisfied. Let $S_{11}$ denote the current produced in branch or element 1 by a unit electromotive force in branch 1, $S_{12}$ the current produced in branch 2 by a unit electromotive force in branch 1, etc. Then by the conjugacy of branches 1 and 2 and branches 3 and 4, it follows that $$S_{12} = S_{34} = 0.$$

Also by equation (1)

$$(S_{44})^2 R_4 = (S_{42})^2 R_2 + (S_{41})^2 R_1 = \frac{1}{4R_4} \quad (1')$$

and by equation (2)

$$(S_{11})^2 R_1 = (S_{13})^2 R_3 + (S_{14})^2 R_4 = \frac{1}{4R_1} \quad (2')$$

Now it is a fundamental principle which is deducible from elementary algebra, that $S_{41} = S_{14}$. That is, the current set up in branch 1 by a unit electromotive force in branch 4 is equal to the current set up in branch 4 by a unit electromotive in branch 1. Multiplying equation (1') by $R_4$ and equation (2') by $R_1$ and subtracting it follows that:

$$(S_{42})^2 R_2 R_4 = (S_{13})^2 R_1 R_3 \quad (a)$$

Now in accordance with the notation adopted in this specification, the energy consumed in branch 3 is $x$ times that consumed in branch 4 when an electromotive force acts in branch 1; therefore $$(S_{13})^2 R_3 = x(S_{14})^2 R_4 \quad (b)$$

Also the energy consumed in branch 1 is $y$ times that consumed in branch 2 when an electromotive force acts in branch 4; whence $$(S_{14})^2 R_1 = y(S_{24})^2 R_2 \quad (c)$$

Multiplying (b) and (c)

$$(S_{13})^2 R_1 R_3 = xy(S_{24})^2 R_2 R_4 \quad (d)$$

From (a) and (d) it follows at once that $xy = 1$.

Obviously the expression given by formula (5) is a maximum when $y = 1$. This means that for a given amount of telephonic energy developed in the transmitter at the transmitting substation a maximum amount is usefully delivered to the receiver at the receiving substation connected by the line, when $y = 1$. Since the maximum amount of energy in the receiver is the prime desideratum of telephony, it would appear that the substation should be designed to make $y = 1$. Another consideration, however, modifies this conclusion somewhat, namely, the effect of line noise. Since the line noise originates in the line the amount delivered to the receiver is proportional to $$\frac{1}{1+y}$$

(see equation 4) while the amount of energy delivered from the transmitter of the communicating station is proportional to $$\frac{y}{(1+y)^2}$$

(see equation 5). The ratio of the latter to the former is $$\frac{y}{1+y},$$

and this increases as $y$ increases beyond unity. It will be clear, then, that if $y$ is made greater than unity the substation discriminates against line noise as compared with the signals it is desired to receive. The amount of discrimination desired depends of course on the amount of line noise present. For conditions occurring in practice I have found by experiment that a desirable value for $y$ is 1.4. With this value of $y$ the overall efficiency is reduced 2.8% below the maximum for $y = 1$, while the receiving efficiency alone is reduced 16.6%. It is thus seen that a good degree of discrimination against line noise is obtained with a small loss in overall efficiency.

The above considerations as to overall efficiency and discrimination against line noise may be formulated as $$R_1(I_1)^2 = y R_2(I_2)^2 \quad (6)$$

for an electromotive force inserted in the line. In this equation $y$ is to have a value lying between 1 and 1.5 preferably.

Figure 1:
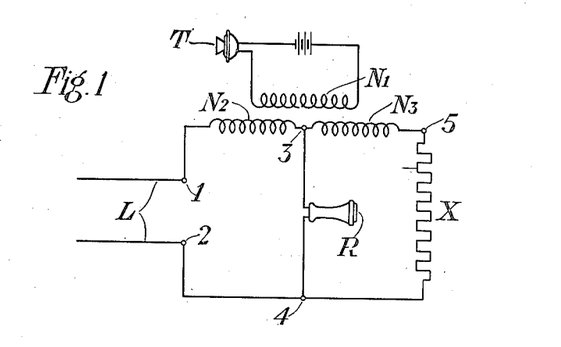
Figure 1 is a diagram representing one form of my invention.
Figure 1A:
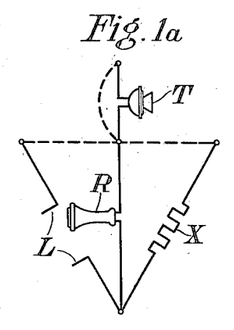
Figs. 1(a), 5(a), 8(a) and 11(a) are schematic diagrams of the substations of Figs. 1, 5, 8 and 11 respectively, showing more clearly the equivalence of the several modifications.

Proceeding now to a description of the specific circuits, in Fig. 1 a telephone line L terminates in a substation comprising a transmitter T, a receiver R, an auxiliary resistance X, and a transformer having three windings $N_1$, $N_2$ and $N_3$ whose number of turns will be designated as $n_1$, $n_2$ and $n_3$ respectively. Windings $N_2$ and $N_3$ together with resistance X are in series with the line, the receiver R being connected from the mid-point of windings $N_2$ and $N_3$ to one side of the line at terminal 4. Winding $N_1$ is in a local circuit with the transmitter T.

Figure 2:
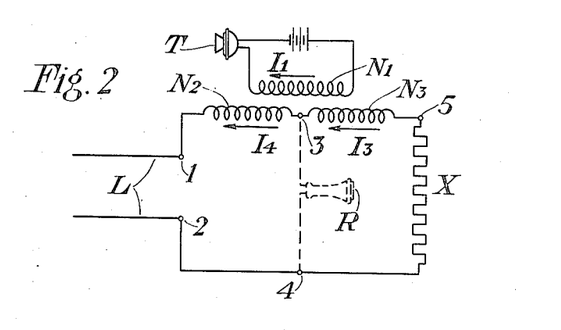
Figs. 2 and 3 are diagrams representing the current flow in the substation of Fig. 1 during transmission and reception respectively.

The operation of the substation in transmitting will now be clear from an inspection of Fig. 2. The transmitter varies the current flowing in the local circuit, its action being equivalent to setting up in the transmitter a variable electromotive force which causes an alternating current to flow. The direction of this current at a given instant of time is indicated by the arrow in Fig. 2, the transmitter current being designated $I_1$. This current induces currents $I_3$ and $I_4$ in the windings $N_3$ and $N_2$, respectively, which currents flow in the same direction with respect to coils $N_2$ and $N_3$ but tend to flow in opposite directions with respect to the receiver so that when the resistance X is properly proportioned with respect to the line impedance, and the transformer windings are properly designed, no current flows in the receiver R while a current $I_4$ is supplied to the line which is equal to current $I_3$ flowing through the auxiliary resistance.

Figure 3:
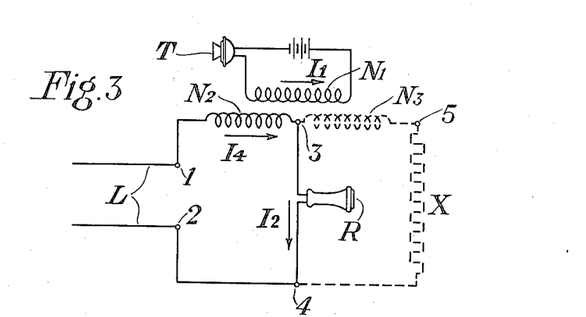

The action when receiving is indicated in Fig. 3. When a potential is applied to the line terminals 1 and 2, a line current $I_4$ is caused to flow through winding $N_2$ to terminal 3 where it tends to divide and part flow through the receiver and part through the auxiliary resistance X. Due to the inductive relation of coils $N_2$ and $N_3$, however, a counter-electromotive force is set up in coil $N_3$ which balances the electromotive force tending to cause a flow of current through the resistance X so that no current flows in the auxiliary resistance, but a current $I_2$ equal to the line current flows in the receiver. No energy loss occurs in the auxiliary resistance, and while some energy is lost due to a current $I_1$ induced in winding $N_1$ and flowing through the transmitter, this loss is no greater than the transmitter loss in a standard substation.

The proportioning of the arrangement of Fig. 1 to satisfy the fundamental requirements of the substation of my invention will now be given. In deriving the design formulæ the resistances of the transformer windings will be ignored. It will be assumed, further, that there is no magnetic leakage between the transformer windings and that the self impedances are very large compared with the impedances of any of the component elements of the substation, or the impedance of the line. Experience has shown that these simplifying assumptions are justified and that the assumed conditions may be closely realized in practice by careful design.

To formulate the condition for conjugacy of transmitter T and receiver R, assume an electromotive force in the transmitter circuit and assume that the required condition of conjugacy is satisfied; in other words, assume that the terminals of the receiver are at points of equal potential with respect to an electromotive force applied to the transmitter. Let $I_1$, $I_2$, $I_3$ and $I_4$ denote the currents flowing in the transmitter, receiver, auxiliary resistance, and line respectively, and $R_1$, $R_2$, $R_3$ and $R_4$ denote the resistances of the corresponding elements. The condition of conjugacy of the receiver with respect to the transmitter requires that no current flow through the receiver, hence $I_2=0$. It is also clear from Fig. 2 that if no current flows through the receiver $I_3=I_4$.

Since the potential drop across the receiver must be zero, and since the drops in the several windings are proportional to the number of turns in said windings, it follows that the drop through the auxiliary resistance plus the drop through the winding $N_3$ must be zero. Then if K designates the drop per turn, and $n_1$, $n_2$ and $n_3$ represent the number of turns on windings $N_1$, $N_2$ and $N_3$ respectively, $$Kn_3+R_3I_3=0.$$

Similarly the line drop plus the drop through winding $N_2$ must be zero, hence $$Kn_2+R_4I_4=0.$$

Remembering that $I_3=I_4$ the last two equations reduce to $$R_3=\left(\frac{n_3}{n_2}\right)R_4 \quad (7)$$

which is the expression for the condition that the receiver must be conjugate with respect to the transmitter.

The next requirement is that the auxiliary resistance must be conjugate with respect to the line or in other words it must be connected to points of equal potential with respect to an electromotive force applied to the line. Therefore if a potential V be applied across line terminals 1 and 2 in Fig. 3 the drop through winding $N_2$ and receiver R must be equal to the applied potential, since no current can flow through X. Hence $$V=Kn_2+I_2R_2$$

Moreover since points 4 and 5 must be at the same potential, the drop through winding $N_2$ plus that through $N_3$ must also equal the applied potential so that $$V=Kn_2+Kn_3.$$

From the last two equations it is clear that $$I_2R_2=Kn_3.$$

Further, the potential drop through winding $N_1$ must equal the drop through the transmitter whence $$I_1R_1=Kn_1$$

From Fig. 3 it is clear that the line current is equal to the current through the receiver; hence $$I_4=I_2$$

From the theory of transformer action, bearing in mind that no current flows in winding $N_3$ it follows that $$I_4n_2=I_1n_1.$$

The last four equations reduce to $$R_2=\left(\frac{n_3}{n_1}\right)\left(\frac{n_2}{n_1}\right)R_1 \quad (8)$$

which expression satisfies the condition that the auxiliary resistance must be conjugate with respect to the line.

The next requirement is that of maximum output of the transmitter as expressed in equation (2). From Fig. 2, since no current flows through the receiver during transmission it may be seen by the theory of transformer action that $$I_1 n_1 = I_4 n_2 + I_3 n_3$$

Since $I_3$ and $I_4$ are equal this becomes $$I_1 n_1 = I_4 (n_2 + n_3)$$

From this formula it is clear that during transmission current $I_1$ is proportional to $n_2 + n_3$ and $I_4$ is proportional to $n_1$. $I_3$ being equal to $I_4$ is also proportional to $n_1$. Substituting these values in equation (2) we have as the expression for maximum output of the transmitter $$(n_2 + n_3)^2 R_1 = n_1^2 (R_3 + R_4) \quad (9)$$

The requirement of maximum absorption of energy from the line by the receiver, was expressed in formula (1). Remembering that $I_4$ is equal to $I_2$ this formula becomes $$R_4 = R_2 + \left(\frac{I_1}{I_4}\right)^2 R_1$$

From Fig. 3 by the theory of transformer action $n_2 I_4 = n_1 I_1$ from which it is clear that during reception $I_4$ is proportional to $n_1$ and $I_1$ is proportional to $n_2$. Substituting these values in the above equation we have as the expression for the condition of maximum absorption by the receiver $$R_4 = R_2 + \left(\frac{n_2}{n_1}\right)^2 R_1 \quad (10)$$

Similarly if during reception the energy absorbed by the transmitter is $y$ times that absorbed by the receiver from the line, equation (6) becomes $$R_1 = y \left(\frac{n_1}{n_2}\right)^2 R_2 \quad (11)$$

Collecting formulæ 7 to 11 inclusive and denoting the ratio $\frac{n_2}{n_1}$ by $r$ and $\frac{n_3}{n_1}$ by $r'$ we have the following design formulæ for the circuit of Fig. 1:—

$$\left. \begin{array}{l} r = \sqrt{\dfrac{R_4}{R_1} \dfrac{y}{1+y}} \\[4pt] r' = \sqrt{\dfrac{R_4}{R_1} \dfrac{1}{y(1+y)}} \\[4pt] R_3 = \dfrac{1}{y} R_4 \\[4pt] R_2 = \left(\dfrac{1}{1+y}\right) R_4 \end{array} \right\} A$$

If the substation of Fig. 1 is proportioned in accordance with design formulæ (A) it will satisfy all the fundamental requirements and is ideally efficient. It will be observed that the transformer ratios, $r$ and $r'$ and the resistances $R_3$ and $R_2$ of the auxiliary and receiver respectively are determined in terms of the ratio $\frac{R_4}{R_1}$ and the parameter $y$ which measures the energy division. If, therefore, $R_1$, $R_4$ and $y$ are specified the other constants are determined.

Figure 4:
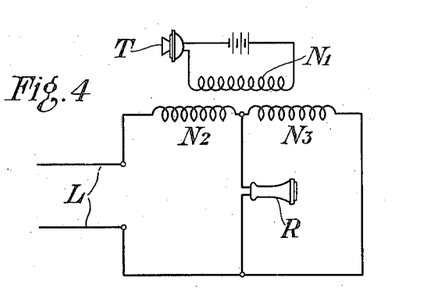
Fig. 4 is a diagram showing the substation of Fig. 1 slightly modified.

Fig. 4 is a diagram of an arrangement similar and equivalent to the arrangement of Fig. 1 except that in Fig. 4 the resistance X of Fig. 1 is incorporated in the winding $N_3$. In this figure, therefore, the windings $N_1$ and $N_2$ are of low and preferably negligible resistance while the winding $N_3$ has a definite resistance $R_3$ whose value is determined by design formulæ A.

Figure 5:
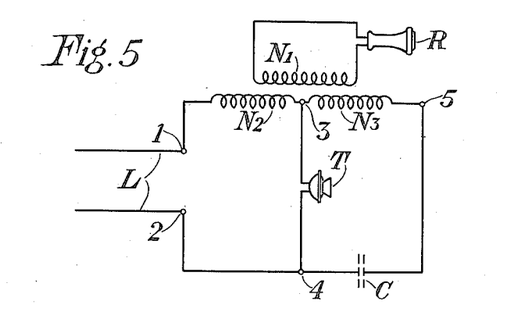
Figs. 5, 8 and 11 are diagrams of still further modifications of the invention.
Figure 5A:
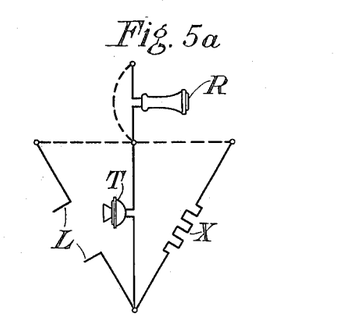

Fig. 5 is another arrangement differing from the arrangement of Fig. 4 in that the positions of transmitter T and receiver R are interchanged. Fig. 5 is the preferable arrangement when it is desired to supply the direct current for the transmitter from a common battery, the arrangement of Figs. 1 and 4 being adapted for local battery supply. A condenser C may be provided to prevent the flow of direct current through the auxiliary resistance.

Figure 6:
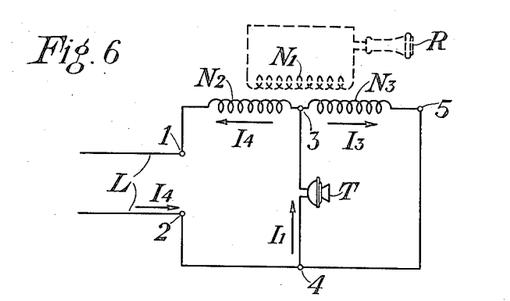
Figs. 6, 9 and 12 are diagrams representing the current flow during transmission in the substations of Figs. 5, 8 and 11 respectively.

The operation of this circuit during transmission will be clear from Fig. 6. The variable potential set up by the transmitter causes a current of instantaneous value $I_1$ to flow through the transmitter to terminal 3 where it divides and a current $I_4$ flows through the line, while a current $I_3$ flows through the high resistance winding $N_3$. These two currents acting through primaries $N_2$ and $N_3$ tend to set up equal and opposite electromotive forces in the winding $N_1$ so that no induced current flows through the receiver R.

Figure 7:
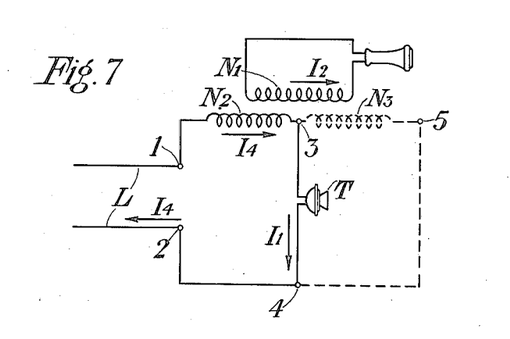
Figs. 7, 10 and 13 are diagrams representing the current flow during reception in the substations of Figs. 5, 8 and 11, respectively.

The operation during receiving is illustrated in Fig. 7. An electromotive force from the line applied to terminals 1 and 2 causes a current $I_4$ to flow through winding $N_2$, to terminal 3 where it tends to divide and part flow through transmitter T, the other part flowing through the high resistance of $N_3$. Due to the inductive action between windings $N_2$ and $N_3$, however, a counter-electromotive force is set up in winding $N_3$ which balances the electromotive force tending to cause a current flow through $N_3$ so that no current flow occurs through this circuit, while a current $I_1$ equal to line current $I_4$ flows through the transmitter. At the same time an electromotive force is induced in secondary $N_1$ which causes a current $I_2$ to flow through the receiver R. No energy is wasted through the high resistance winding $N_3$, the only energy loss being that through the transmitter T, which is no greater loss than would occur in a standard substation circuit.

The design formulæ for the circuit of Fig.

5 will be obvious without derivation when it is remembered that the two circuits differ merely by the transposition of elements T and R. By transposing their resistances $R_1$ and $R_2$ in the design formulæ (A) we have as the design formulæ for Fig. 5:—

$$r = \sqrt{\frac{R_4}{R_2} \frac{y}{1+y}}$$
$$r' = \sqrt{\frac{R_4}{R_2} \frac{1}{y(1+y)}} \quad (B)'$$
$$R_3 = \frac{1}{y} R_4$$
$$R_1 = \frac{1}{1+y} R_4$$

Figure 8:
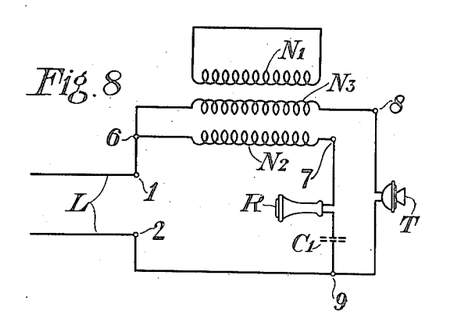
Figure 8A:
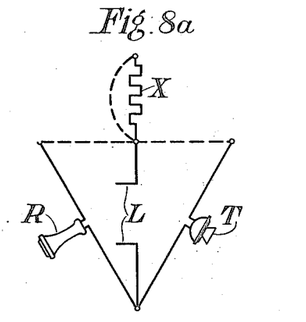

A still further modification is shown in Fig. 8 which differs from Fig. 1 in that the receiver and the line are interchanged, the line being connected to the common terminal of windings $N_2$ and $N_3$, and the receiver being connected to the other terminal of winding $N_2$. The transmitter and auxiliary resistance are also interchanged, the transmitter being connected to the opposite terminal of winding $N_3$ while the auxiliary resistance is included in the local circuit of the third winding $N_1$. In this instance, however, the auxiliary resistance is incorporated in the winding $N_1$ which is accordingly made of high resistance, the resistance of windings $N_2$ and $N_3$ being of negligible resistance. This modification is adapted for common battery work. A condenser $C_1$ may be inserted in the receiver circuit if desired.

Figure 9:
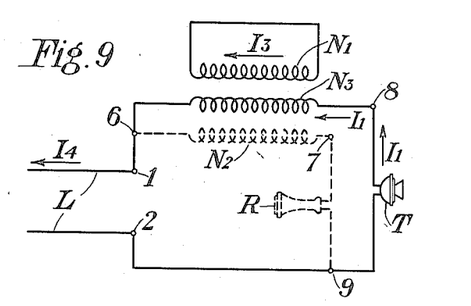

The operation in transmitting is illustrated in Fig. 9. The operation of the transmitter T sets up an electromotive force causing a current $I_1$ to flow through winding $N^3$ to terminal 6 where it would tend to divide and part flow through receiver R and part through the line L, were it not for the fact that a counter-electromotive force is set up in winding $N_2$ of such value as to neutralize the electromotive force tending to send current through R. Consequently a current $I_4$ of a value equal to $I_1$ flows to the line, and no energy passes through the receiver. At the same time an electromotive force is induced in winding $N_1$ causing a current $I_3$ to flow through the high resistance of said winding. Winding $N_2$ must be wound in the opposite direction from $N_3$ to produce this result, while $N_1$ may be wound in either direction.

Figure 10:
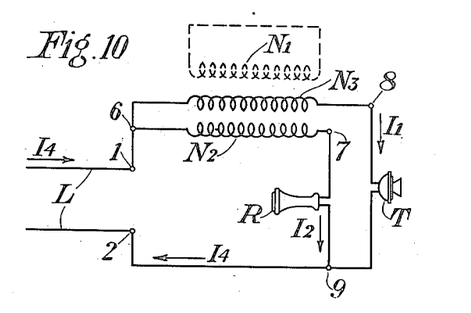

In receiving, as shown in Fig. 10, a current $I_4$ flowing in from the line divides at terminals 6 and 9 so that currents $I_1$ and $I_2$ flow through the transmitter and receiver respectively. Owing to coils $N_2$ and $N_3$ being oppositely wound, if the proper number of turns are given to the coils, the currents $I_1$ and $I_2$ tend to produce equal and opposite electromotive forces in the high resistance winding $N_1$ so that no current flows in the latter and no energy is thereby wasted in the high resistance of said winding.

The formulæ for the proper design of the various elements of the substation of Fig. 8 may be determined as follows:

The first requirement is that no current shall flow in the receiver during transmission. From Fig. 9 it is then clear that the transmitter current must equal the line current, or $$I_1 = I_4$$

Moreover from the theory of transformer action $$I_4 n_3 = I_3 n_1$$

Also the drop across the winding $N_1$ must equal the drop through ohmic resistance in the circuit of $N_1$. Hence $$I_3 R_3 = K n_1.$$

Now if a potential V be applied across the terminals 8 and 9 of the transmitter, it is apparent that, $$V = K n_3 + I_4 R_4.$$

And since points 7 and 9 are at the same potential $$V = K n_3 + K n_2$$

From the last two equations it is clear that $$I_4 R_4 = K n_2.$$

From this equation and the third equation above given we get $$\frac{n_2}{n_1} = \frac{I_4}{I_3} \cdot \frac{R_4}{R_3}$$

which reduces to $$\frac{R_4}{R_3} = \frac{n_2 n_3}{(n_1)^2} \quad (12)$$

which is the expression satisfying the requirement that the receiver must be conjugate with respect to the transmitter.

The next requirement is that no received energy must be wasted in the auxiliary resistance of winding $N_1$. If then in Fig. 10 a receiving potential V be applied across terminals 1 and 2 it is apparent that this potential must equal the drop through $N_2$ plus the drop through the receiver. It must also equal the drop through $N_3$ plus the drop through the transmitter. Therefore $$V = K n_2 + R_2 I_2.$$
$$V = -K n_3 + R_1 i_1.$$

From the theory of transformer action $$I_1 n_3 = I_2 n_2.$$

Moreover it is apparent that $$I_4 = I_2 + I_1.$$

Again the drop across the winding of $N^1$ must equal the drop through the high resistance $R^3$ of the auxiliary circuit. Hence $$Kn_1 = R_3 I_3.$$

As no current flows in this circuit it is at once apparent that K, the drop per turn, is zero and this constant at once vanishes from the first two equations, and the various expressions reduce to $$\frac{R_2}{R_1} = \frac{n_2}{n_3} \quad (13)$$

which is the expression satisfying the requirement of conjugacy between the line and auxiliary resistance.

The next condition to be considered is that of maximum output of the transmitter, which was expressed in formula (2) above. It has just been shown from Fig. 9 that $I_4 n_3 = I_3 n_1$ and that $I_4 = I_1$ while the receiver current $I_2$ is zero. It is at once apparent that during transmission currents $I_4$, $I_3$ and $I_1$ are proportional respectively to $n_1$, $n_3$ and $n_1$. Substituting the latter values in equation (2) we have $$(n_{11})^2 R_1 = (n_1)^2 R_4 + (n_3)^2 R_3 \quad (14)$$

The condition of maximum absorption of energy from the line during receiving was expressed in equation (1). It has just been determined from Fig. 10 that the current in the auxiliary resistance is zero and that $I_1 n_3 = I_2 n_2$ and that $I_4 = I_1 + I_2$. From the first equation it is apparent that during reception currents $I_1$ and $I_2$ are proportional to $n_2$ and $n_3$ respectively and from the latter it follows that $I_4$ is proportional to $n_2 + n_3$. Substituting these values in equation (1) we have $$R_4 (n_2 + n_3)^2 = R_2 (n_3)^2 + R_1 (n_2)^2 \quad (15)$$

Substituting the same values in equation (6) we have for the condition of over-all efficiency and fine noise discrimination $$R_1 (n_2)^2 = y R_2 (n_3)^2 \quad (16)$$

Letting the ratios $\frac{n_2}{n_1} = r$ and $\frac{n_3}{n_1} = r'$, and substituting these values in equations (12) to (16) and collecting we have as the design formulæ which satisfy the five requirements above given:

$$\left. \begin{array}{l} r = \sqrt{y \frac{R_4}{R_3}} \\ r' = \sqrt{\frac{1}{y} \frac{R_4}{R_3}} \\ R_1 = \left(\frac{y+1}{y}\right) R_4 \\ R_2 = (y+1) R_4 \end{array} \right\} (C)$$

Figure 11:
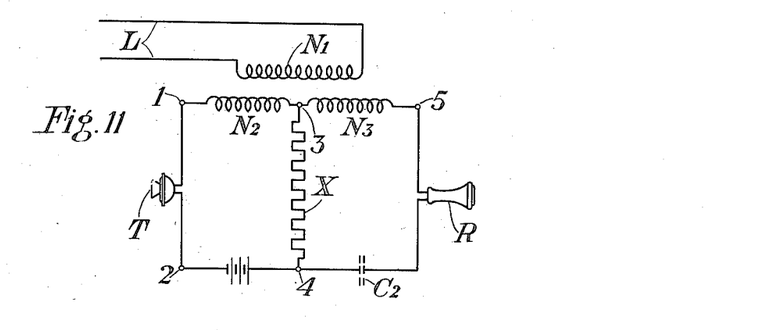
Figure 11A:
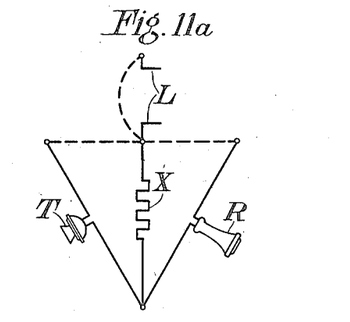
Figure 12:
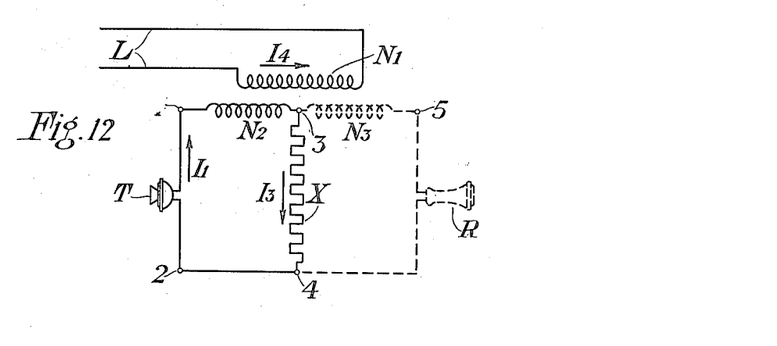

A still further modification is illustrated in Fig. 11. In this figure the arrangement of Fig. 1 is still further varied by transposing the line and the transmitter and also interchanging the receiver and auxiliary resistance. This modification is adapted for a local battery substation, and a condenser $C_2$ may be inserted in the receiver circuit to prevent the flow of direct current. The operation in transmitting is illustrated in Fig. 12. The transmitter causes variations in the steady current flow due to the local battery, which is equivalent to applying a source of varying potential at the transmitter which causes an instantaneous current $I_3$ to flow through the transmitter to terminal 3 where it tends to divide and part flows through auxiliary resistance and part through the receiver R. Due to the inductive action between windings $N_2$ and $N_3$ however, a counter-electromotive force is set up in the winding $N_3$ which neutralizes the electromotive force tending to cause current flow in the receiver, so that the full current $I_3$ flows through the resistance X and back to the transmitter. At the same time, due to the inductive action between $N_2$ and $N_1$ a current $I_4$ is caused to flow to the line.

Figure 13:
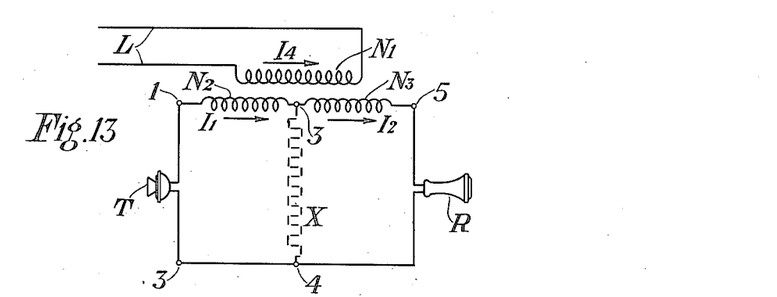

The receiving action, illustrated in Fig. 13, is as follows:

A potential applied to the line causes a current $I_4$ to flow through the winding $N_1$. Induced currents $I_1$ and $I_4$ are set up in windings $N_2$ and $N_3$. These currents are equal and flow in the same direction with respect to windings $N_2$ and $N_3$ but tend to flow in opposite directions with respect to resistance X so that no current flows through the resistance X and no energy is wasted therein during receiving.

The proper proportions of the parts, whereby the above results are obtained and the other requirements set forth in the beginning of this specification satisfied, may be determined by design formulæ derived in a manner similar to that described in connection with the other modifications.

From Fig. 12, during transmission the following equations are obtained in a manner similar to that described in connection with Fig. 1:—

$$I_1 = I_3$$

$$I_1 n_2 = I_4 n_1$$

$$V = K n_2 + I_3 R_3$$

$$V = K n_2 + K n_3$$

$$I_4 R_4 = K n_1$$

From these equations we may derive as the equation satisfying the condition of conjugacy of the receiver with respect to the transmitter, the following:—

$$\frac{R_4}{R_3} = \frac{n_1 n_1}{n_3 n_3} \quad (17)$$

Similarly, during the operation of receiving, from Fig. 13 we have, $$I_1 = I_2$$
$$Kn_2 + R_1 I_1 = 0$$
$$Kn_3 + R_2 I_2 = 0$$
$$I_4 n_1 = I_1 n_2 + I_2 n_3$$

From these equations may be obtained the following equation satisfying the condition of conjugacy of the auxiliary resistance with respect to the line:—

$$\frac{R_1}{R_2} = \frac{n_2}{n_3} \quad (18)$$

Also from Fig. 12 we have $I_1 n_2 = I_4 n_1$ and $I_1 = I_3$ from which it is apparent that during transmission $I_1$, $I_4$ and $I_3$ are proportional to $n_1$, $n_2$ and $n_1$ respectively. Substituting these values in equation (2) the expression for the maximum transmission of energy to the line becomes.

$$R_1(n_1)^2 = R_4(n_2)^2 + R^3(n_1)^2 \quad (19)$$

Likewise from Fig. 13, $$I_1 = I_2$$
and
$$I_4 n_1 = I_1 n_2 + I_2 n_3$$

from which it is clear that during reception $I_4$ is proportional to $n_2 + n_3$ and $I_1$ and $I_2$ are each proportional to $n_1$. Substituting in equation (1) we have as the expression for the requirement of maximum absorption by the receiver.

$$R_4(n_2 + n_3)^2 = R_2(n_1)^2 + R_1(n_1)^2 \quad (20)$$

Also by substituting in equation (6) we have $$R_1(n_1)^2 = yR_2(n_1)^2$$

which reduces to $$R_1 = yR_2 \quad (21)$$

as the equation which satisfies the requirement of over-all efficiency and discrimination against line noise.

By expressing the ratios $\frac{n_2}{n_1}$ and $\frac{n_3}{n_1}$ as $r$ and $r'$ respectively, equations (17) to (21) inclusive may be collected and reduced to the following design formulæ.

$$\left. \begin{array}{l} r = \sqrt{\dfrac{R_1}{R_4} \dfrac{y}{y+1}} \\[6pt] r' = \sqrt{\dfrac{R_1}{R_4} \dfrac{1}{y(y+1)}} \\[6pt] R_2 = \dfrac{R_1}{y} \\[6pt] R_3 = \dfrac{R_1}{y+1} \end{array} \right\} (D)$$

A comparison of the several sets of design formulæ A, B, C and D shows that these formulæ are quite similar and that any one may be derived from the other by substituting for the various resistances $R_1$, $R_2$, $R_3$ and $R_4$ in the design formulæ of a particular circuit, the resistances which have been interchanged therewith in another circuit.

The fundamental equivalence of these circuits will be clear from an inspection of Figs. 1(a), 5(a), 8(a) and 11(a) which are schematic representations of the circuits of Figs. 1, 5, 8 and 11 respectively. The dotted lines indicate transformer windings. It is apparent from a comparison of these simplified diagrams that other modifications may be made by simply interchanging the positions of some or all of the elements, the transmitter, receiver, auxiliary resistance and line. The design formulæ for such additional modifications may be at once derived by proper interchange of the resistances $R_1$, $R_2$, $R_3$ and $R_4$ in the design formulæ already derived.

The type of substation disclosed above and illustrated in the accompanying drawing is but one of a large number employing only one transformer and one auxiliary resistance and all of these are ideal in the sense that they satisfy the fundamental requirements for an ideal substation, as stated heretofore in this specification. It will be understood therefore, that my invention is not limited to the specific embodiments herein illustrated, but is broadly directed to providing a substation comprising a single transformer and only one auxiliary element which is so proportioned with reference to the line with which it is to be coöperatively combined, that it is ideally efficient and substantially without side tone. Furthermore, I do not desire to limit the design of the substations herein disclosed and illustrated to the accompanying design formulæ. These formulæ are derived on the assumption that ideal transformers are employed and that the component elements have no reactance, assumptions which are only approximately justified in practice. When particularly high precision is desired I may, therefore, proportion the substation more precisely by taking into account the fact that the transformer impedances are finite, and that the line and the various substation elements may have in general some reactance. The accompanying formulæ however, give quite satisfactory results, and the methods by which they are derived will enable one skilled in the art, to compute more precisely the substation constants when desired.

It will be understood that in the appended claims, where certain elements are said to be conjugate, or certain impedance relations are said to exist, since in practice these conditions can, in general, only be approximated, these expressions will be satisfied by structures substantially conforming thereto, especially where some compromise with regard to the rigid requirements is necessary in order to discriminate against line noise. It will also be understood that while I have specifically illustrated and described my invention as embodied in a telephone substation it is capable of many and varied embodiments which render it applicable in other kinds of signaling systems and consequently my invention is not to be limited to the particular form and use herein disclosed. It will be further understood that in this specification the word substation is employed in its generic sense and that consequently its significance is not limited to a subscriber's telephone station but embraces broadly a telephone station including a repeater station for relaying telephonic signals.

What is claimed is:

1. In a two-way signaling system, a transmission circuit, a transmitting circuit proper including transmitting apparatus, a receiving circuit proper including receiving apparatus, a balancing circuit and a transformer having a plurality of windings, two of said circuits having a winding of said transformer therein and having a terminal in common with one of the other circuits, the remaining circuit being connected with the other circuits inductively only, the transformer ratios and the impedances of two of the four component elements consisting of said transmission circuit, said balancing circuit, said transmitting apparatus and said receiving apparatus being so proportioned with reference to the impedance of the other two that said receiving apparatus and transmitting apparatus are conjugate.

2. In a two-way signaling system, a transmission circuit, a transmitting circuit proper including transmitting apparatus, a receiving circuit proper including receiving apparatus, a balancing circuit and a transformer having a plurality of windings, two of said circuits having a winding of said transformer therein and having a terminal in common with one of the other circuits, the remaining circuit being connected with the other circuits inductively only, the transformer ratios and the impedances of two of the four component elements consisting of said transmission circuit, said balancing circuit, said transmitting apparatus and said receiving apparatus being so proportioned with respect to the impedances of the other two that said balancing circuit and transmission circuit are conjugate.

3. In a two-way signaling system, a transmission circuit, a transmitting circuit proper including transmitting apparatus, a receiving circuit proper including receiving apparatus, a balancing circuit and a transformer having a plurality of windings, two of said circuits having a winding of said transformer therein and having a terminal in common with one of the other circuits, the remaining circuit being connected with the other circuits inductively only, the transformer ratios and the impedances of two of the four component elements consisting of said transmission circuit, said balancing circuit, said transmitting apparatus and said receiving apparatus being so proportioned with reference to the impedances of the other two that the impedance of the combination consisting of the transmitting apparatus, receiving apparatus, balancing circuit and transformer as seen from said transmission circuit is equal to that of said transmission circuit.

4. In a two-way signaling system, a transmission circuit, a transmitting circuit proper including transmitting apparatus, a receiving circuit proper including receiving apparatus, a balancing circuit and a transformer having a plurality of windings, two of said circuits having a winding of said transformer therein and having a terminal in common with one of the other circuits, the remaining circuit being connected with the other circuits inductively only, the transformer ratios and the impedances of two of the four component elements consisting of said transmission circuit, said balancing circuit, said transmitting apparatus and said receiving apparatus being so proportioned with reference to the impedances of the other two that the impedance of the combination consisting of said transmission circuit, said balancing circuit, said receiving apparatus and said transformer as seen from the transmitting apparatus is equal to that of said transmitting apparatus.

5. In a two-way signaling system, a transmission circuit, a transmitting circuit proper including transmitting apparatus, a receiving circuit proper including receiving apparatus, a balancing circuit and a transformer having a plurality of windings, two of said circuits having a winding of said transformer therein and having a terminal in common with one of the other circuits, the remaining circuit being connected with the other circuits inductively only, the transformer ratios and the impedances of two of the four component elements consisting of said transmission circuit, said balancing circuit, said transmitting apparatus and said receiving apparatus being so proportioned with reference to the impedances of the other two that said receiving apparatus and transmitting apparatus are conjugate, said balancing circuit and said transmission circuit are conjugate, the impedance of the combination consisting of said transmitting apparatus, said receiving apparatus, said balancing circuit and said transformer as seen from the transmission circuit is equal to that of said transmission circuit, and the impedance of the combination consisting of transmission circuit, balancing circuit, receiving apparatus and transformer as seen from the transmitting apparatus is equal to that of said transmitting apparatus.

6. The combination of a substation and a telephone line circuit, said substation comprising a transmitting circuit proper including a transmitter, a receiving circuit proper including a receiver, an auxiliary resistance, and a transformer having a plurality of windings, said auxiliary resistance being incorporated in one winding of said transformer, windings of said transformer included in each of two of the three circuits, the circuits of three of the four component elements consisting of said line circuit, transmitter, receiver and auxiliary resistance having one terminal in common, the fourth component element being associated with the other component elements inductively only, the transformer ratios and the impedances of two of said component elements being so proportioned in accordance with the impedances of the other two that said receiver and transmitter are conjugate.

7. The combination of a substation and a telephone line circuit, said substation comprising a transmitting circuit proper including a transmitter, a receiving circuit proper including a receiver, an auxiliary resistance, and a transformer having a plurality of windings, said auxiliary resistance being incorporated in one winding of said transformer, windings of said transformer included in each of two of the three circuits, the circuits of three of the four component elements consisting of said line circuit, transmitter, receiver and auxiliary resistance having one terminal in common, the fourth component element being associated with the other component elements inductively only, the transformer ratios and the impedances of two of said component elements being so proportioned in accordance with the impedances of the other two that said auxiliary resistance and said line are conjugate.

8. The combination of a substation and a telephone line circuit, said substation comprising a transmitting circuit proper including a transmitter, a receiving circuit proper including a receiver, an auxiliary resistance, and a transformer having a plurality of windings, said auxiliary resistance being incorporated in one winding of said transformer, windings of said transformer included in each of two of the three circuits, the circuits of three of the four component elements consisting of said line circuit, transmitter, receiver and auxiliary resistance having one terminal in common, the fourth component element being associated with the other component elements inductively only, the transformer ratios and the impedances of two of said component elements being so proportioned in accordance with the impedances of the other two that the impedance of the substation as seen from the line circuit is equal to the impedance of the line.

9. The combination of a substation and a telephone line circuit, said substation comprising a transmitting circuit proper including a transmitter, a receiving circuit proper including a receiver, an auxiliary resistance, and a transformer having a plurality of windings, said auxiliary resistance being incorporated in one winding of said transformer, windings of said transformer included in each of two of the three circuits, the circuits of three of the four component elements consisting of said line circuit, transmitter, receiver and auxiliary resistance having one terminal in common, the fourth component element being associated with the other component elements inductively only, the transformer ratios and the impedances of two of said component elements being so proportioned in accordance with the impedances of the other two that the impedance of the combination consisting of the line circuit, receiver, and auxiliary resistance as seen from the transmitter is equal to the impedance of the transmitter.

10. The combination of a substation and a telephone line circuit, said substation comprising a transmitting circuit proper including a transmitter, a receiving circuit proper including a receiver, an auxiliary resistance, and a transformer having a plurality of windings, said auxiliary resistance being incorporated in one winding of said transformer, windings of said transformer included in each of two of the three circuits, the circuits of three of the four component elements consisting of said line circuit, transmitter, receiver and auxiliary resistance having one terminal in common, the fourth component element being associated with the other component elements inductively only, the transformer ratios and the impedances of two of said component elements being so proportioned in accordance with the impedances of the other two that said receiver and transmitter are conjugate, said auxiliary resistance and said line circuit are conjugate, the impedance of said substation as seen from the line circuit is equal to the impedance of the line, and the impedance of the combination consisting of the line circuit, receiver and auxiliary resistance as seen from said transmitter is equal to the impedance of the transmitter.

11. The combination of a substation and a telephone line, said substation comprising a transmitter, a receiver and a transformer having two low resistance windings and a high resistance winding, a common terminal for said line and said receiver, said high resistance winding being connected between said common terminal and the other terminal of said receiver, one of said low resistance windings being connected between the separate terminals of said line and said receiver, and said transmitter being connected across the other of said low resistance windings.

12. A telephone apparatus comprising a line, a subscriber's apparatus associated therewith, said apparatus comprising a transmitter, a receiver, an auxiliary resistance, and an induction coil having a plurality of windings, said receiver and resistance having common circuit terminals, one of said terminals being directly connected to one side of the line, and the other terminal being connected to the other side of the line through one winding of the transformer, said transmitter being serially connected with another winding of the transformer and associated with the other elements inductively only.

13. A signaling apparatus comprising a circuit for the transmission and reception of energy, a transmitting apparatus, a receiving apparatus, a balancing circuit, and an induction coil having a plurality of windings, one winding of said induction coil being included in said first mentioned circuit, a second winding being included in said balancing circuit, both said circuits having common junction points, a receiver bridged across said junction points, and said transmitting apparatus being associated with the other elements inductively only by a series connection with a third winding of said induction coil.

14. A signaling apparatus comprising a circuit for the transmission and reception of energy, a transmitting apparatus, a receiving apparatus, an auxiliary balancing circuit, and an induction coil having a plurality of windings, said receiving apparatus and said auxiliary balancing circuit being connected in parallel across said first mentioned circuit, a winding of said induction coil in each of said circuits, and said transmitting apparatus being associated therewith inductively only by a serial connection with another winding.

15. The combination of a telephone line and a telephone station, said station including a transmitting element, a receiving element, an auxiliary element including a balancing resistance, and a multiple coil transformer, said line, receiving element and auxiliary element having a common terminal, one winding of said induction coil being included in said line, and a local circuit including another winding of said induction coil and said transmitting element in series.

In testimony whereof, I have signed my name to this specification in the presence of two subscribing witnesses, this first day of September, 1916.

GEORGE A. CAMPBELL.

Witnesses:
C. C. ROSE,
JOHN R. CARSON.